United States Patent
Iwaya et al.

(10) Patent No.: US 10,703,951 B2
(45) Date of Patent: Jul. 7, 2020

(54) HEAT-TRANSPORT MEDIUM INCLUDING LATENT HEAT STORAGE MATERIAL, MIXTURE FOR HEAT TRANSPORT, AND HEAT TRANSPORT METHOD

(71) Applicant: Daicel Corporation, Osaka-shi, Osaka (JP)

(72) Inventors: Masao Iwaya, Tokyo (JP); Tomoya Mizuta, Tokyo (JP); Naotaka Nishio, Himeji (JP); Yutaka Isobe, Himeji (JP); Masatake Kudoh, Myoko (JP); Masanori Yoshikane, Tokyo (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/737,685

(22) PCT Filed: Jun. 13, 2016

(86) PCT No.: PCT/JP2016/067495
§ 371 (c)(1),
(2) Date: Dec. 18, 2017

(87) PCT Pub. No.: WO2016/204108
PCT Pub. Date: Dec. 22, 2016

(65) Prior Publication Data
US 2018/0187059 A1    Jul. 5, 2018

(30) Foreign Application Priority Data
Jun. 19, 2015    (JP) ................. 2015-123941

(51) Int. Cl.
*C09K 5/14*    (2006.01)
*C09K 5/06*    (2006.01)
*F28D 20/02*    (2006.01)

(52) U.S. Cl.
CPC ............. *C09K 5/14* (2013.01); *C09K 5/063* (2013.01); *F28D 20/023* (2013.01);
(Continued)

(58) Field of Classification Search
CPC ... C09K 5/00; C09K 5/10; C09K 5/14; C09K 5/16
(Continued)

(56) References Cited

U.S. PATENT DOCUMENTS

| 3,596,713 A * | 8/1971 | Katz | ............... C09K 5/06 126/400 |
| 4,985,468 A * | 1/1991 | Elmes | ............... C08J 9/28 521/138 |

(Continued)

FOREIGN PATENT DOCUMENTS

| JP | 4-222894 A | 8/1992 |
| JP | 5-41678 B2 | 6/1993 |

(Continued)

OTHER PUBLICATIONS

English translation of International Preliminary Report on Patentability and Written Opinion dated Dec. 28, 2017, in PCT International Application No. PCT/JP2016/067495.

(Continued)

*Primary Examiner* — Jane L Stanley
(74) *Attorney, Agent, or Firm* — Birch, Stewart, Kolasch & Birch, LLP (57) ABSTRACT

Disclosed is a heat transport medium to be transported with a fluid that is liquid in an operating temperature range containing a porous material and a latent heat storage material penetrated in the pores of the porous material, wherein the latent heat storage material is incompatible with the fluid and has a melting point within the operating temperature range, and the porous material has a liquid (Continued)

repellency to the fluid, an affinity for the latent heat storage material, and a sponge hardness of not more than 50. This invention achieves stable heat transport with a high heat conversion efficiency even by circulating the medium through a pipeline over a long period of time. The porous material has an apparent density of about 0.05 to 0.5 g/cm$^3$.

12 Claims, 1 Drawing Sheet

(52) U.S. Cl.
CPC .......... *C09K 2205/12* (2013.01); *F28D 20/02* (2013.01); *Y02P 20/124* (2015.11)

(58) Field of Classification Search
USPC .......................................................... 252/71
See application file for complete search history.

(56) References Cited

U.S. PATENT DOCUMENTS

| | | | | |
|---|---|---|---|---|
| 5,106,520 A | * | 4/1992 | Salyer | A01G 13/0237 |
| | | | | 252/69 |
| 5,403,566 A | * | 4/1995 | Panster | B01J 20/22 |
| | | | | 210/688 |
| 6,063,312 A | * | 5/2000 | Mannheimer | C09K 5/063 |
| | | | | 252/572 |
| 6,284,158 B1 | * | 9/2001 | Marshall | C09K 5/063 |
| | | | | 252/572 |
| 2002/0147242 A1 | * | 10/2002 | Salyer | C08J 9/0009 |
| | | | | 521/50 |
| 2006/0199011 A1 | | 9/2006 | Jahns | |
| 2015/0008361 A1 | * | 1/2015 | Hattori | C08L 83/00 |
| | | | | 252/75 |
| 2016/0251557 A1 | | 9/2016 | Suzuki et al. | |

FOREIGN PATENT DOCUMENTS

| | | |
|---|---|---|
| JP | 5-215369 A | 8/1993 |
| JP | 10-332177 A | 12/1998 |
| JP | 2000-161082 A | 6/2000 |
| JP | 2002-523719 A | 7/2002 |
| JP | 3641362 B2 | 4/2005 |
| JP | 2006-523744 A | 10/2006 |
| JP | 2008-144054 A | 6/2008 |
| WO | WO 2013/077379 A1 | 5/2013 |
| WO | WO 2015/025529 A1 | 2/2015 |

OTHER PUBLICATIONS

Hayase et al., "A Superamphiphobic Macroporous Silicone Monolith with Marshmallow-like Flexibility", Angew. Chem. Int. Ed., 2013, 52, pp. 10788-10791.
Hayase et al., "Development of Marshmallow-Like Gel", Chemistry Today, Apr. 2014, No. 517, pp. 36-39.
International Search Report for PCT/JP2016/067495 (PCT/ISA/210) dated Sep. 6, 2016.
Written Opinion of the International Searching Authority for PCT/JP2016/067495 (PCT/ISA/237) dated Sep. 6, 2016.

* cited by examiner

HEAT-TRANSPORT MEDIUM INCLUDING LATENT HEAT STORAGE MATERIAL, MIXTURE FOR HEAT TRANSPORT, AND HEAT TRANSPORT METHOD

TECHNICAL FIELD

The present invention relates to a heat transport medium (a heat storage material) containing a latent heat storage material effectively utilizable for heat transport by a pipeline (on-line heat transport), a mixture for heat transport comprising the medium, and a heat transport method using the medium.

BACKGROUND ART

In cooling of an air conditioner or a thermal grid system or intake air cooling of a gas turbine (a gas turbine device), heat is transported by circulating a heat transport medium having a heat storage property through a pipeline (pipe). As the heat transport medium, water or brine for utilizing sensible heat is known, and water is widely used from the viewpoint of low cost and high safety. However, for sensible heat transport with the heat transport medium such as water, the heat transport medium has a small heat capacity, and a large carrying power (a huge pump) is required to carry a large quantity of the heat transport medium. In a wide area thermal grid, the problem with use of sensible heat transport is a low energy efficiency. To solve this problem, it has also been studied a method of utilizing latent heat associated with a phase change of a latent heat storage material as the heat transport medium. For latent heat transport with the latent heat storage material, the latent heat storage material, which has a large heat capacity, prevents the drop in temperature over long distances of transportation and also cuts down a carrying power. Unfortunately, the latent heat storage material solidifies by phase change to block a pipeline, and thus the latent heat storage material cannot be utilized as it is. To solve this problem, it has been reported a method of utilizing a microencapsulated latent heat storage material. According to this method, heat transport (heat exchange) using a latent heat of a latent heat storage material and a sensible heat of a fluid is performed by circulating the fluid containing microcapsules filled with the latent heat storage material.

Japanese Patent Application Laid-Open Publication No. 5-215369 (JP-5-215369A, Patent Document 1) discloses a method of cooling or heating an object by circulating, in a closed circuit between a cooling device or a heating device and a heat exchanger, a heating medium cooled or heated with the cooling device or the heating device to cool or heat the heat exchanger; the heating medium is a mixture of a large number of resin microcapsules containing a heat storage material such as paraffin, and water or brine.

WO2015/025529 (Patent Document 2) discloses a latent heat transport material microencapsulated in a hard shell (or a hard shell microencapsulated latent heat transport material), as a heat medium of a heat transport device that recovers high-temperature waste heat and transports the waste heat to a place where heat is necessary; the hard shell microencapsulated latent heat transport material comprises a phase change material that absorbs or releases a latent heat in response to temperature changes, and non-porous hollow silica particles enclosing the phase change material.

Japanese Patent Application Laid-Open Publication No. 2000-161082 (JP-2000-161082A, Patent Document 3) discloses an intake air cooling device for a gas turbine; the intake air cooling device comprises an intake port, an intake path from the intake port to the gas turbine, and an ice thermal storage tank coupled with the intake path, the ice thermal storage tank having a large number of heat storage capsules, each having a solid periphery, arranged leaving ventilation gaps, and the ice thermal storage tank being configured to directly contact at least a portion of an intake air with the peripheries of the heat storage capsules across the ice thermal storage tank to cool the portion of the intake air. This document discloses that capsules enclosing a heat storage material that undergoes solid-liquid change in a temperature range of 0 to 20° C. are used as the heat storage capsules.

Unfortunately, for these heat-transport media, which have a latent heat transport material microencapsulated therein, the microcapsules would be broken with long-term use or by an external stress (e.g., a mechanical stress such as a shearing force in pumping), resulting in aggregation of the latent heat storage material which would solidify in a pipeline inside a cooling device to block the pipeline. If the shell of the microcapsules is strengthened or thickened to avoid the microcapsules from broken, the microcapsules would decrease the heat exchange efficiency. Thus, there is a trade-off relationship between the heat conversion efficiency and the stability.

Japanese Patent Application Laid-Open Publication No. 4-222894 (JP-4-222894A, Patent Document 4) discloses a medium for heat-transfer system; the medium comprises a continuous phase that is liquid at least in use and a dispersed phase having an average particle size of 0.2 to 50 μm and exclusively consisting of a heat storage material having a melting point higher than the continuous phase. This document discloses the following: if the medium is in a suspension state having the dispersed phase in a solid state, the average particle size of the dispersed phase is 0.2 to 50 μm and thus the medium is transferred while maintaining an excellent flowability; and if the continuous phase is formed of a poly (ethylene glycol) and/or a poly(propylene glycol), the continuous phase has a thickening action to prevent the aggregation of the dispersed phases.

Japanese Patent No. 3641362 (JP-3641362B, Patent Document 5) discloses a cold storage agent of a cold body to be used for an air conditioner (such as an air-cooling apparatus) or a cooling device for food or other products; the cold storage agent is an aqueous solution containing an inclusion hydrate producing substance having a concentration less than a concentration providing a congruent melting point of an inclusion hydrate, and is configured to produce an inclusion hydrate by cooling and give a slurry.

Unfortunately, for the emulsion or suspension and the slurry, the dispersed phase is exposed in the fluid and thus may be aggregated. Further, for the slurry, the dissolved latent heat storage material is essentially unutilized, decreasing the heat conversion efficiency.

Japanese Examined Patent Application Publication No. 5-41678 (JP-5-41678B, Patent Document 6) discloses a heat storage composition containing a phase change material and a polyolefin-based carrier material having the phase change material incorporated therein; the phase change material is a substance which has such a compatibility that the phase change material is dispersed in the carrier material and does not substantially exude out of the system, and the phase change material is at least one substance selected from the group consisting of a crystalline straight-chain alkyl hydrocarbon, a crystalline fatty acid, a crystalline fatty acid ester, a crystalline alicyclic hydrocarbon, and a crystalline aromatic hydrocarbon. This document discloses that the polyolefin-based carrier material is preferably a crosslinked polyolefin. This document also discloses that the composition is incorporated in gypsum or concrete to be utilized for a building material.

Japanese Patent Application Laid-Open Publication (Translation of PCT Application) No. 2002-523719 (JP-2002-523719A, Patent Document 7) discloses a latent heat body having a paraffin-based latent heat storage material and a carrier material having a holding space in which the paraffin-based latent heat storage material is absorbed; the carrier material has a capillary holding space formed thereinside for the latent heat storage material, and the carrier material is a mineral substance with an open capillary pore structure. This document discloses that the latent heat body is utilizable for, e.g., a building material (e.g., a heat storage wall, a roof, and a floor storage heating system), a warming plate for rice, a radiator disposed between a bare floor and a covering in an electric floor heating, and a transport container for maintaining an article stored in the container at a constant temperature during transport. This document also discloses that the carrier material having a holding space includes a gypsum material, a clay material, a calcareous sandstone, a siliceous earth, a wood fiber, and a cardboard.

However, Patent Documents 6 and 7 fail to disclose use (heat transport) of a latent heat storage material in a fluid. Incidentally, these compositions or latent heat bodies have no shape recoverability. If these compositions or latent heat bodies are used as a heat transport medium, the heat transport medium may be broken by an external load stress to exude the latent heat storage material. The exuded latent heat storage material would gradually aggregate without reabsorption to the carrier material, which fails to restore a shape thereof, and the aggregation would cause blockage of a pipeline by solidification.

CITATION LIST

Patent Literature

Patent Document 1: JP-5-215369A (Claims)
Patent Document 2: WO2015/025529 (Claims and paragraph [0047])
Patent Document 3: JP-2000-161082A (claim 1, and paragraphs [0001] and [0037])
Patent Document 4: JP-4-222894A (claim 1, and the 2nd column, lines 13 to 32)
Patent Document 5: JP-3641362B (claim 1 and paragraph [0001])
Patent Document 6: JP-5-41678B (claim 1, the 8th column, lines 4 to 6, the 22th column, lines 5 to 14, and Examples)
Patent Document 7: JP-2002-523719A (Claims and paragraphs [0012] to [0015])

SUMMARY OF INVENTION

Technical Problem

It is therefore an object of the present invention to provide a heat transport medium which achieves stable heat transport with a high heat conversion efficiency even by adding the heat transport medium to a fluid that is liquid in an operating temperature range and circulating the heat transport medium through a pipeline over a long period of time; and to provide a mixture (or a mixture liquid) for heat transport comprising the medium and a heat transport method using the medium.

Another object of the present invention is to provide a heat transport medium which achieves efficient heat transport (heat conversion) at a small carrying (or conveyance) power even through a pipeline connecting distant places; and to provide a mixture (or a mixture liquid) for heat transport comprising the medium and a heat transport method using the medium.

Solution to Problem

The inventors of the present invention made intensive studies to achieve the above objects and finally found that use of the following heat transport medium as a heat transport medium to be transported with a fluid that is liquid in an operating temperature range achieves stable heat transport with a high heat conversion efficiency even by adding the heat transport medium to a fluid that is liquid in an operating temperature range and circulating the heat transport medium through a pipeline over a long period of time; the heat transport medium comprises a latent heat storage material being incompatible with the fluid and having a melting point within the operating temperature range, and a porous material having a liquid repellency to the fluid, an affinity for the latent heat storage material and a sponge hardness of not more than 50, and the latent heat storage material is penetrated (or infiltrated) in the porous material. The present invention was accomplished based on the above findings.

That is, an aspect of the present invention provides a heat transport medium to be transported with a fluid that is liquid in an operating temperature range; the heat transport medium comprises a porous material (or a porous body) having pores and a latent heat storage material penetrated (or infiltrated) in the pores of the porous material, the porous material has a liquid repellency to the fluid, an affinity for the latent heat storage material, and a sponge hardness of not more than 50, and the latent heat storage material is incompatible with the fluid and has a melting point within the operating temperature range. The porous material may have an open-cell structure. The porous material may have a void ratio of not less than 50%. The porous material has an apparent density of about 0.05 to 0.5 g/cm$^3$. The porous material has macropores having an average pore size of about 0.5 to 200 μm. The porous material may be in a particulate form having an average particle size of 0.1 to 50 mm (for example, an isotropic particulate form). The ratio of the latent heat storage material is about 100 to 5000 parts by weight relative to 100 parts by weight of the porous material.

The porous material may contain a water-repellent lipophilic resin. The porous material may have a contact angle with water of not less than 90°, and the porous material may be capable of absorbing (for example, rapidly absorbing) tetradecane and may have substantially no contact angle with tetradecane. The porous material may have a polyorganosiloxane skeleton. In the heat transport medium containing such a porous material, the latent heat storage material may comprise an aliphatic hydrocarbon (for example, a $C_{14-60}$alkane), and the fluid may be water.

Another aspect of the present invention provides a mixture for heat transport; the mixture comprises the heat transport medium and a fluid that is liquid in an operating temperature range and is incompatible with the latent heat storage material. The ratio of the heat transport medium is about 1 to 50 parts by weight relative to 100 parts by weight of the fluid.

Still another aspect of the present invention provides a heat transport method; the method comprises adding the heat transport medium to a fluid that is liquid in an operating temperature range and is incompatible with the latent heat storage material, and circulating the heat transport medium through a pipeline.

Advantageous Effects of Invention

According to the present invention, as the heat transport medium to be transported with a fluid that is liquid in an operating temperature range, the latent heat storage material being incompatible with the fluid and having a melting point within the operating temperature range is penetrated in the porous material having a liquid repellency to the fluid, an affinity for the latent heat storage material, and a sponge hardness of not more than 50. Such a heat transport medium achieves stable heat transport with a high heat conversion efficiency even by adding the heat transport medium to a fluid that is liquid in an operating temperature range and circulating the heat transport medium through a pipeline over a long period of time. Further, the heat transport medium achieves efficient heat transport (heat conversion) at a small carrying power even through a pipeline connecting distant places. Thus, the heat transport medium is also useful for, e.g., district heating and cooling or cogeneration, which needs heat transport to a distant (or faraway) place through a pipeline.

DESCRIPTION OF EMBODIMENTS

[Porous Material]

According to an embodiment of the present invention, the heat transport medium contains a porous material (or a porous body). In an embodiment of the present invention, the porous material has a latent heat storage material penetrated (or infiltrated) in the porous material. The porous material has softness (or flexibility), and in a case where the porous material undergoes an external stress, the stress is absorbed by deformation which prevents damage to the porous material. In addition, the porous material has a high affinity for the latent heat storage material, and the latent heat storage material exuding from the porous material by the deformation is easily reabsorbed into the porous material with shape restoration of the porous material. Further, even in a case where the porous material is damaged by a high shearing force or other factors, the damaged pieces of the porous material each hold a function substantially equivalent to the function of the non-damaged porous material. Furthermore, in a case where the heat transport medium, which has the latent heat storage material received in the porous material, is added to (or mixed in) a fluid incompatible with the latent heat storage material, the unencapsulated latent heat storage material attached to (or filled in) the pores or surface of the porous material is contactable with the fluid, differently from microcapsules, and thus the heat transport medium has a high heat conversion efficiency. Accordingly, the present invention achieves stable heat transport with a high heat conversion efficiency even by adding the heat transport medium to a fluid that is liquid in an operating temperature range and circulating the heat transport medium through a pipeline over a long period of time.

The porous material has a high softness (or flexibility) and has a sponge hardness of not more than 50, for example, about 0.01 to 50, preferably about 0.1 to 48, and more preferably about 0.3 to 45 (particularly about 0.5 to 40). From the viewpoint of stable heat transport over a long period of time, the porous material may have a sponge hardness of, for example, about 0.1 to 10, preferably about 0.3 to 5, and more preferably about 0.5 to 3. A porous material having an excessively high sponge hardness would have a low or decreased softness, which makes stable heat transport difficult. A porous material having an excessively low sponge hardness may have a very low mechanical strength and be easily torn to pieces by shearing of a pump, which makes stable heat transport difficult. In the present invention, the sponge hardness can be measured by a sponge durometer or hardness tester (ASKER Type E) based on Japanese Industrial Standards (JIS) K6253.

The porous material may have a closed-cell (independent pore) structure. To improve the softness and to increase the capacity holding the latent heat storage material, it is preferred that the porous material have an open-cell (continuous through hole or interconnected pore) structure. The proportion of the interconnected pores in the pores of the porous material may be not less than 50%, preferably not less than 80%, and more preferably not less than 90% (e.g., 90 to 100%). The porous material may have the open-cell structure alone.

From the viewpoint of an excellent softness and a large capacity holding the latent heat storage material, the porous material may have a void ratio of not less than 50%, for example, about 50 to 99%, preferably about 65 to 98% (e.g., about 70 to 95%), and more preferably about 75 to 90% (particularly about 80 to 85%). A porous material having an excessively low void ratio may have a low softness, and a low or lowered capacity holding the latent heat storage material. A porous material having an excessively high void ratio may have a low or decreased strength. In the present invention, the void ratio can be determined in accordance with Japan Concrete Institute (JCI) Test plan (JCI Test plan: JCI-SPO2-1) volumetric method, specifically, can be measured according to the method described in Examples below.

The porous material has an air permeance (or air permeability) of, for example, about 0 to 100 second/100 ml, preferably about 0 to 50 second/100 ml, and more preferably about 0 to 20 second/100 ml (particularly about 0 to 10 second/100 ml). In a case where the porous material has such an air permeance, the porous material has an open-cell structure having an excellent softness and a high capacity holding the latent heat storage material. A porous material having an excessively low air permeance may have a lowered capacity holding the latent heat storage material. A porous material having an excessively high air permeance may have a low strength. In the present invention, the air permeance can be measured by using a test piece having an average film thickness of 1 mm in accordance with JIS P8117:2009 "Paper and board—Determination of air permeance and air resistance (medium range)—Gurley method".

The porous material has an apparent density of, for example, about 0.05 to 0.5 g/cm$^3$, preferably about 0.08 to 0.4 g/cm$^3$ (e.g., about 0.1 to 0.3 g/cm$^3$), and more preferably about 0.12 to 0.25 g/cm$^3$ (particularly about 0.15 to 0.2 g/cm$^3$). A porous material having an excessively high apparent density may have a low softness, and a low capacity holding the latent heat storage material. A porous material having an excessively low apparent density may have a low strength. In the present invention, the apparent density can be determined in accordance with JIS Z8807:2012 "Method of measuring density and specific gravity of solid", specifically, can be measured according to the method described in Examples below.

The porous material preferably has macropores (with a pore size of not smaller than 50 nm) defined by International Union of Pure and Applied Chemistry (IUPAC). The macropores have an average pore size of, for example, about 0.5 to 200 μm, preferably about 1 to 150 μm (e.g., about 3 to 100 μm), and more preferably about 5 to 80 μm (particularly about 10 to 50 μm). A porous material having macropores with an excessively small average pore size may have a low softness, and a low capacity holding the latent heat storage material. A porous material having macropores with an excessively large average pore size may have a low strength.

The porous material has a skeleton having an average diameter (or a partition having an average thickness) of, for example, about 0.1 to 100 μm, preferably about 0.5 to 50 μm (e.g., about 1 to 30 μm), and more preferably about 1.5 to 10 μm (particularly about 2 to 5 μm). A porous material having a partition with an excessively large average thickness may have a low softness, and a low capacity holding the latent heat storage material. A porous material having a partition with an excessively small average thickness may have a low strength.

The porous material has a porous structure having the above characteristics. The structure of the skeleton may be a partition formed by joining (or connecting) particles (in particular, substantially truly spherical particles) two-dimensionally and three-dimensionally continuously. Each particle constituting the partition has an average particle size of, for example, about 0.5 to 30 μm, preferably about 1 to 20 μm (e.g., about 2 to 15 μm), and more preferably about 3 to 10 μm (particularly about 4 to 8 μm).

In the present invention, the average pore size of the macropores of the porous material, the average thickness of the partition, and each particle constituting the partition can be determined based on an electron microscope image, specifically, can be measured according to the method described in Examples below.

The shape (overall shape) of the porous material is not particularly limited to a specific one. For example, the shape of the porous material may be either an isotropic form (such as a truly spherical or substantially truly spherical form, or a substantially cubic form) or an anisotropic form (such as a plate-like form, an ellipsoidal form, a substantially rectangular prism form, an amorphous form, or a fiber form). The shape of the porous material is usually a particulate (or granular) form. In view of an excellent heat conversion efficiency, the isotropic form (in particular, a spherical form, for example, a truly spherical or substantially truly spherical form) is preferred.

The porous material has an average particle size (or a diameter) of, for example, about 0.1 to 50 mm, preferably about 0.2 to 30 mm, and more preferably about 0.5 to 20 mm (particularly about 1 to 15 mm). A porous material having an excessively small average particle size may have a reduced heat conversion efficiency due to a lowered capacity holding the latent heat storage material. A porous material having an excessively large average particle size may increase the carrying power.

The porous material may be any material having a liquid repellency to the fluid and an affinity for the latent heat storage material and is not limited to particular materials. From the viewpoint of an excellent softness, the porous material usually contains a resin component. The resin component can be roughly classified into an oil-repellent hydrophilic resin and a water-repellent lipophilic resin.

In the porous material containing the oil-repellent hydrophilic resin, water to be impregnated is rapidly penetrated, and thus it is substantially difficult to measure a contact angle with water. The porous material has substantially no contact angle with water. On the other hand, the porous material containing the oil-repellent hydrophilic resin may have a contact angle with an oil material (for example, tetradecane) to be used as the fluid of not less than 50° (for example, about 50 to 150°, preferably about 60 to 140°, and more preferably about 90 to 135°).

The oil-repellent hydrophilic resin having such a surface wettability and softness may include, for example, a polyvinyl acetal-series resin and a cellulose. The polyvinyl acetal-series resin may be a polymer having polyvinyl alcohol crosslinked with an aldehyde (for example, an aliphatic aldehyde such as formaldehyde, acetaldehyde, butyraldehyde, or acrylic aldehyde, an aliphatic dialdehyde such as glyoxal, and an aromatic aldehyde such as benzaldehyde).

In the porous material containing the water-repellent lipophilic resin, the latent heat storage material to be impregnated (for example, tetradecane) is rapidly penetrated, and thus it is substantially difficult to measure a contact angle with the latent heat storage material. The porous material has substantially no contact angle with the latent heat storage material. On the other hand, the porous material containing the water-repellent lipophilic resin may have a contact angle with water to be used as the fluid of not less than 50° (for example, about 50 to 150°, preferably about 60 to 140°, and more preferably about 90 to 135°).

As the water-repellent lipophilic resin having such a surface wettability and softness, a silicon-containing resin may be used. Examples of the silicon-containing resin may include a resin having a silicon atom introduced by treating a resin having a functional group (for example, a polyvinyl acetal-series resin and a cellulose, as the oil-repellent hydrophilic resin) with a silane coupling agent, a resin having a polyorganosiloxane skeleton, or other resins.

In the present invention, the contact angle can be determined as an angle between a tangent of a 1- to 10-μL droplet on the surface of the porous material and the surface of the porous material by using a commercially available contact angle meter, specifically, can be measured according to the method described in Examples below.

Among these resins, the water-repellent lipophilic resin is preferred since the resin facilitates a design of a porous material having a high affinity for the latent heat storage material and a high liquid repellency to the fluid. The resin having a polyorganosiloxane skeleton (a silicone resin) is particularly preferred.

In the silicone resin, the polyorganosiloxane (silicone) skeleton may be a skeleton containing at least one unit selected from the group consisting of a monofunctional M unit (a unit generally represented by $R^3SiO_{1/2}$), a difunctional D unit (a unit generally represented by $R^2SiO_{2/2}$), a trifunctional T unit (a unit generally represented by $RSiO_{3/2}$), a tetrafunctional Q unit (a unit generally represented by $SiO_{4/2}$), a penta- or more-functional (polyfunctional) unit (for example, a unit obtainable by coupling the above units to contain two or more silicon atoms).

In the formulae of the M unit, the D unit, and the T unit, the group R represents a substituent. The substituent may include an alkyl group, an aryl group, a cycloalkyl group, a vinyl group, a mercaptoalkyl group, or other groups. The alkyl group may include, for example, a $C_{1-12}$alkyl group such as methyl, ethyl, propyl, butyl, hexyl, octyl, or decyl. The aryl group may include, for example, a $C_{6-20}$aryl group such as phenyl, methylphenyl (tolyl), dimethylphenyl (xylyl), or naphthyl. Examples of the cycloalkyl group may include a $C_{5-14}$ cycloalkyl group such as cyclopentyl, cyclohexyl, or methylcyclohexyl. The mercaptoalkyl group may include, for example, a mercapto$C_{1-4}$alkyl group such as mercaptopropyl group. These substituents may be the same or different groups. Among these substituents, examples of the preferred group may include a $C_{1-3}$alkyl group such as methyl group, and a $C_{6-12}$aryl group such as phenyl group. From the viewpoint of water-repellent lipophilicity, easy purveyance of the latent heat storage material, or other respects, a $C_{1-2}$alkyl group such as methyl group is particularly preferred.

The silicone resin preferably includes a resin having a three-dimensional network structure. It is preferred that the resin at least contain the D unit and the tri- or more-functional (polyfunctional) unit (for example, the T unit) among units constituting the polyorganosiloxane skeleton. From the viewpoint of easy formation of a soft (or flexible) porous material, the combination of the D unit and the T unit is particularly preferred. The molar ratio of the D unit relative to the tri- or more-functional unit (in particular, the T unit) is about 1/10 to 5/1, preferably about 1/5 to 2/1 (for example, about 1/3 to 1/1), and more preferably about 1/5 to 1.5/1 (for example, about 1/4 to 1.2/1) in the former/the latter. An excessively high ratio of the D unit may make the formation of the network structure difficult. An excessively low ratio of the D unit may provide a low strength of the porous material.

A porous material (silicone sponge) formed of the resin having the polyorganosiloxane skeleton can be produced by a sol-gel reaction accompanied with a conventional phase separation step. A silicone sponge at least containing the D unit and the tri- or more-functional unit (in particular, a silicone sponge containing the D unit and the T unit) can be produced by an acid-base two-step reaction using an acid catalyst (for example, acetic acid) and a basic catalyst (for example, urea) as polycondensation control agents in the presence of a surfactant (for example, a cationic surfactant such as hexadecyltrimethylammonium chloride) as a phase separation control agent. Specifically, as a process for producing a silicone sponge, for example, production processes as described in Japanese Patent Application Laid-Open Publication Nos. 2014-61457 and 2015-48417 can be utilized.

The porous material contains the resin component (the oil-repellent hydrophilic resin or the water-repellent lipophilic resin). The proportion of the resin component in the porous material is not less than 50% by weight, preferably not less than 80% by weight, and more preferably not less than 90% by weight. The porous material may contain the resin component alone.

[Latent Heat Storage Material]

According to an embodiment of the present invention, the heat transport medium further contains a latent heat storage material. The latent heat storage material may be any substance having a melting point within an operating temperature range and an affinity for the porous material and being incompatible with the fluid, and is not limited to particular substances. The latent heat storage material can be selected according to the species of the porous material and the fluid.

In a case where the porous material is formed of the oil-repellent hydrophilic resin, the latent heat storage material may include, for example, water, a lower alcohol (e.g., a $C_{1-4}$alcohol such as methanol, ethanol, or isopropanol), a polyhydric alcohol (e.g., a $C_{2-3}$alkanediol such as ethylene glycol or propylene glycol, and a polyoxy$C_{2-3}$alkylene glycol such as diethylene glycol), a ketone (such as acetone), a cyclic ether (such as dioxane or tetrahydrofuran), and an amide (such as dimethylacetamide). These latent heat storage materials may be used alone or in combination. Further, these latent heat storage materials (in particular, water) may contain an inorganic salt or a hydrate thereof (e.g., a metal chloride such as sodium chloride, magnesium chloride, or calcium chloride; a carbonate such as sodium carbonate; a metal hydroxide such as sodium hydroxide or lithium hydroxide; a metal sulfate such as sodium sulfate; a metal hydrogen phosphate such as sodium hydrogen phosphate; a metal nitrate such as calcium nitrate, zinc nitrate, or nickel nitrate; a metal thiosulfate such as sodium thiosulfate; a metal acetate such as sodium acetate; and a hydrate of the inorganic salt, such as ammonium alum). These inorganic salts or hydrates thereof may be used in combination to adjust the melting point of the latent heat storage material. In the present invention, the latent heat storage material having a desired melting point can be selected according to the operating temperature range. These latent heat storage materials may have a melting point of, for example, about −50 to 150° C., preferably about −30 to 100° C., and more preferably about −20 to 98° C. Among these latent heat storage materials, a latent heat storage material containing water is preferred from the viewpoint of easiness to handle or other characteristics.

On the other hand, in a case where the porous material is formed of the water-repellent lipophilic resin, the latent heat storage material may include, for example, an aliphatic hydrocarbon (e.g., a saturated or unsaturated aliphatic hydrocarbon having 10 to 60 carbon atoms, such as decane, dodecane, tetradecane, octadecane, heptamethylnonane, or tetramethylpentadecane; n-paraffin; isoparaffin; and a wax), a fat and oil (such as a natural oil or a mineral oil), a fatty acid (e.g., a straight-chain or branched-chain saturated $C_{8-24}$fatty acid such as caprylic acid, capric acid, pelargonic acid, lauric acid, myristic acid, palmitic acid, margaric acid, stearic acid, arachidic acid, or behenic acid; and a straight-chain or branched-chain unsaturated $C_{8-24}$fatty acid such as myristoleic acid, palmitoleic acid, petroselinic acid, oleic acid, vaccenic acid, linoleic acid, linolenic acid, eleostearic acid, gadoleic acid, arachidonic acid, or erucic acid), a derivative of the above fatty acid (e.g., a fatty acid ester, a fatty acid amide, and a higher alcohol, each corresponding to the fatty acid), an alicyclic hydrocarbon (e.g., a $C_{3-10}$cycloalkane such as cyclopentane, cyclohexane, or cycloheptane; and a $C_{4-10}$cycloalkene such as cyclopentene or methylcyclopentene), and an aromatic hydrocarbon (such as benzene, toluene, or xylene). These latent heat storage materials may be used alone or in combination. In the present invention, the latent heat storage material having a desired melting point can be selected according to the operating temperature range. These latent heat storage materials may have a melting point of, for example, about 0 to 100° C., preferably about 0 to 99° C., and more preferably about 2 to 98° C. (in particular, about 3 to 95° C.). In particular, in a case where the heat transport medium is utilized for cooling of a thermal grid system or intake air cooling of gas turbine and water is used as the fluid, the latent heat storage material preferably has a melting point higher than 0° C. For example, the latent heat storage material may have a melting point of about 1 to 50° C., preferably about 2 to 30° C., and more preferably about 3 to 20° C. (particularly about 4 to 10° C.). Among these materials, an aliphatic hydrocarbon such as a $C_{12-16}$alkane, for example, tetradecane (n-tetradecane), is preferred from the viewpoint of high lipophilicity and easiness of design to a desired temperature according to the chain length.

The ratio of the latent heat storage material relative to 100 parts by weight of the porous material is, for example, about 100 to 5000 parts by weight, preferably about 150 to 4000 parts by weight, and more preferably about 200 to 3500 parts by weight (particularly about 250 to 3000 parts by weight). An excessively low ratio of the latent heat storage material may lead to a low heat transport efficiency. An excessively high ratio of the latent heat storage material may lead to aggregation of the latent heat storage material in the fluid because of exceeding the amount the porous material can accommodate.

[Mixture for Heat Transport and Heat Transport Method]

According to an embodiment of the present invention, a mixture for heat transport contains the heat transport medium and a fluid. Specifically, according to an embodiment of the present invention, a heat transport method comprises adding the heat transport medium to a fluid that is liquid in an operating temperature range and is incompatible with the latent heat storage material, and circulating the heat transport medium through a pipeline. Combining (or mixing) the heat transport medium with a fluid that is in a liquid state in an operating temperature range enables the circulation of the heat transport medium through a pipeline (pipe) and the heat transport (heat exchange) using the sensible heat of the fluid in addition to the latent heat of the latent heat storage material.

The fluid may be any fluid that is liquid in an operating temperature range and has a liquid repellency to the porous material and an incompatibility with the latent heat storage material. As the fluid, there may be used a solvent which is used as a conventional heating medium or cooling medium.

In a case where the porous material is formed of the oil-repellent hydrophilic resin, a hydrophobic solvent can be used as the fluid. The hydrophobic solvent may include, for example, an aliphatic hydrocarbon (e.g., a $C_{5-20}$alkane such as pentane, hexane, octane, decane, or dodecane), an aliphatic ketone (such as methyl ethyl ketone, methyl isobutyl ketone, or cyclohexanone), an alicyclic hydrocarbon (e.g., a $C_{3-10}$cycloalkane such as cyclopentane, cyclohexane, or cycloheptane; and a $C_{4-10}$cycloalkene such as cyclopentene or methylcyclopentene), and an aromatic hydrocarbon (such as benzene, toluene, or xylene). These hydrophobic solvents may be used alone or in combination. In the present invention, a solvent having a melting point lower than an operating temperature range can be selected from these solvents. Among these solvents, an aliphatic hydrocarbon such as hexane is preferred from the viewpoint of easiness to handle.

In a case where the porous material is formed of the water-repellent lipophilic resin, a hydrophilic solvent can be used as the fluid. The hydrophilic solvent may include, for example, water, a lower alcohol (e.g., a $C_{1-4}$alcohol such as methanol, ethanol, or isopropanol), a polyhydric alcohol (e.g., a $C_{2-3}$alkanediol such as ethylene glycol or propylene glycol, and a polyoxy$C_{2-3}$alkylene glycol such as diethylene glycol), a ketone (such as acetone), a cyclic ether (such as dioxane or tetrahydrofuran), and an amide (such as dimethylacetamide). These hydrophilic solvents may be used alone or in combination. In the present invention, a solvent having a melting point lower than an operating temperature range can be selected from these solvents. Among these solvents, water is preferred from the viewpoint of easiness to handle.

The ratio of the heat transport medium relative to 100 parts by weight of the fluid is, for example, about 1 to 50 parts by weight, preferably about 2 to 45 parts by weight (e.g., about 2 to 40 parts by weight), and more preferably about 3 to 40 parts by weight (particularly about 5 to 35 parts by weight). An excessively low ratio of the heat transport medium may lead to a low heat conversion efficiency. An excessively high ratio of the heat transport medium may lead to an increased carrying power.

The heat transport medium may contain conventional various additives, in addition to the porous material and the latent heat storage material. Examples of the additives may include a corrosion inhibitor, a surfactant, a stabilizer (such as an antioxidant or an ultraviolet absorber), a filler, a coloring agent, an antistatic agent, a flame retardant, a lubricant, a preservative, a viscosity modifier, a thickener, a levelling agent, and an antifoaming agent. The additive may be contained in the partition of the porous material. The proportion of the additive is not particularly limited to a specific one, and is about not more than 10% by weight (for example, about 0.1 to 10% by weight) in the porous material.

In an embodiment of the present invention, the mixture for heat transport is utilized for, e.g., an air conditioner such as a cooling and heating apparatus, a floor heating, a cooling device for food or other products, a thermal grid system, and an intake air cooling of various internal-combustion engines. The heat transport method comprises circulating the heat transport medium through a pipeline to transport heat. For example, for cogeneration, the heat transport method may comprise circulating the heat transport medium through a pipeline (pipe) to a distant place to transport heat.

EXAMPLES

The following examples are intended to describe this invention in further detail and should by no means be interpreted as defining the scope of the invention. The determination methods of characteristics evaluated in Examples and Comparative Examples are shown below.

[Sponge Hardness]

A porous material was cut into a block 15 mm wide, 15 mm deep, and 10 mm thick. The sponge hardness of the block was measured by a sponge durometer (ASKER Type E) ("WR-207E" manufactured by Nishitokyo Seimitsu Co., Ltd.) in accordance with JIS K6253.

[Apparent Density of Porous Material]

In accordance with JIS Z8807:2012 "Method of measuring density and specific gravity of solid", the apparent density and specific gravity by geometrical measurement using a digital caliper were determined.

[Void Ratio of Porous Material]

In accordance with JCI Test plan (JCI Test plan: JCI-SPO2-1) volumetric method, the void ratio was measured using not water but tetradecane (0.7645 g/ml) as a solvent.

[Average Pore Size of Macropores of Porous Material, Average Size (Thickness) of Partition, and Average Size of Particle Forming Partition]

A porous material was subjected to a sample stage for observation, and platinum was deposited onto the porous material. An image of the resulting sample seen by an electron microscope ("Miniscope3000" manufactured by Hitachi High-Technologies Corporation) was obtained. The pore size of macropores and the thickness of skeleton (partition) were measured at any 10 points on the image, and the average values were determined. Further, the average size of the spherical particles constituting the partition was measured by using an image processing and measurement software ("Win ROOF" manufactured by Tech-Jam Co., Ltd.).

[Contact Angle]

On a one-centimeter cubic porous material, a 5-μL droplet of water was formed by using a contact angle meter ("DropMaster700" manufactured by Kyowa Interface Science Co., Ltd.). From the resulting image data of the droplet, a contact angle between the surface of the porous material and the water droplet was calculated by the conventional 2θ method. The contact angle of water was determined from the average of three measurements (N=3) data.

Example 1

(Synthesis Example of Porous Material)

A 5-mM acetic acid aqueous solution was prepared from ion-exchange water and acetic acid (manufactured by Wako Pure Chemical Industries, Ltd.). In a glass beaker, 100 mL of the acetic acid aqueous solution, 4 g (0.10 mol) of hexadecyltrimethylammonium chloride (manufactured by Wako Pure Chemical Industries, Ltd.), and 30 g (0.06 mol) of urea (manufactured by Wako Pure Chemical Industries, Ltd.) were put, and the resulting mixture was stirred at a room temperature by a magnetic stirrer. After 15 minutes, 28.8 g (0.22 mol) of trimethoxy(methyl)silane (manufactured by Tokyo Chemical Industry Co., Ltd.) and 19.2 g (0.16 mol) of dimethyldimethoxysilane (manufactured by Tokyo Chemical Industry Co., Ltd.) were added to the beaker, and the resulting mixture was stirred for 30 minutes at a room temperature and then stirred for 5 minutes in an oil bath heated to 80° C. Thereafter, the stirring was stopped, and the reaction proceeded at 80° C. for 10 hours to give a white sponge gel. The resulting gel was washed with 400 mL of methanol (manufactured by Wako Pure Chemical Industries, Ltd.) three times and then 400 mL of 2-propanol (manufactured by Wako Pure Chemical Industries, Ltd.) three times. The washed gel was air-dried in a fume hood for 60 hours and was then dried in an oven at 50° C. for 16 hours to give 27.47 g of a porous material.

The sponge hardness of the resulting porous material was taken by 5-point measurements; the measured values were 1.5, 0.8, 1.9, 2.0 and 0.8, and the average of the five values was 1.4. The porous material had an apparent density of 0.172 g/cm$^3$ and a void ratio of 83%. The macropores had a porous size ranging from 2 to 100 μm and had an average pore size of 20 μm. The partition had a thickness ranging from 3 to 150 μm and had an average thickness of 10 μm. Further, the porous material had a contact angle with water of 127°. The porous material rapidly absorbed tetradecane and had no contact angle with tetradecane.

Figure 1:
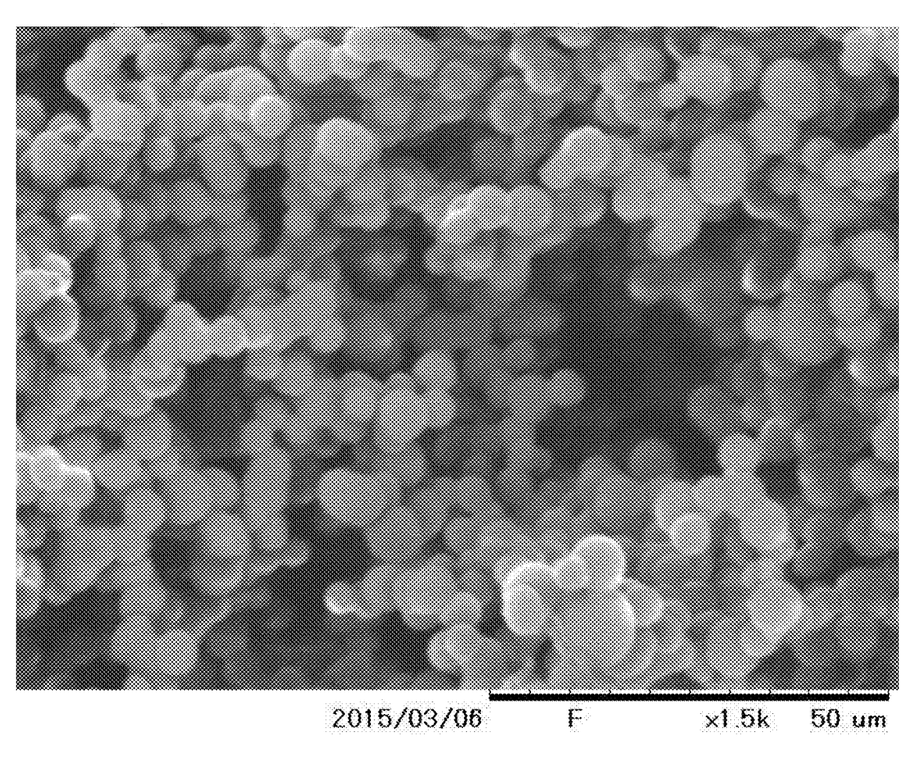
FIG. 1 is a scanning electron micrograph of a porous material obtained in Examples.

FIG. 1 is a scanning electron micrograph of the porous material obtained. As apparent from FIG. 1, the porous material had a structure in which substantially truly spherical particles with an average particle size of about 6 μm were joined two-dimensionally or three-dimensionally continuously.

(Evaluation as Heat Transport Medium)

The resulting porous material was cut into a one-centimeter cubic shape (7.52 g), and 20 g of tetradecane was absorbed to the cubic porous material. The porous material having tetradecane absorbed thereto was set afloat in a beaker with 180 g of ion-exchange water, and the water and the porous material were stirred at about 300 rpm by a magnetic stirrer. Then, the water and the gel (porous material) having tetradecane absorbed thereto and floating on the water were stirred for 3 hours while cooling in an ice bath. At the time, the tetradecane impregnated in the gel was coagulated completely. Thereafter, the ice bath was removed, and the water and the gel were stirred at a room temperature for 3 hours. At the time, the tetradecane impregnated in the gel was melted completely. This cycle was considered as one cycle, and four cycles were performed in total. After the four cycles were performed, the gel was filtered with a metal gauge. Then, the visual observation of the water layer found that the water layer had no oil content floating on the water. That is, the tetradecane remained in the porous material during the cycles.

Example 2

The porous material obtained in the Synthesis example of Example 1 was cut into a cubic shape (0.83 g), and 2.24 g of tetradecane was absorbed to the block porous material. The resulting porous material was set afloat in a petri dish with 200 g of water. The block porous material having tetradecane absorbed thereto was crushed on the bottom of the petri dish with a finger until it become impossible to push the block porous material with a finger. During this time, although the absorbed tetradecane exuded from the porous material, the tetradecane clung to the porous material and was not liberated or separated from the porous material in water. Then, when the finger was detached, the porous material was quickly returned to the original shape with no damage. The exuded tetradecane was also quickly reabsorbed into the porous material, and the original state, in which the porous material having tetradecane absorbed thereto was put on water, was returned.

INDUSTRIAL APPLICABILITY

According to the present invention, the heat transport medium is utilizable for heat transport applications in which the fluid containing the heat transport medium is circulated through a pipeline (pipe), for example, an air conditioner such as a cooling and heating apparatus, a floor heating, a cooling device for food or other products, a thermal grid system, and an intake air cooling of various internal-combustion engines. In particular, the heat transport medium achieves heat transport with a high heat conversion efficiency at a small carrying power, and is effectively utilized for a district heating and cooling or a cogeneration using waste heat (a heat transport apparatus that recovers high-temperature waste heat and transports the waste heat to a distant (or faraway) place where heat is necessary).

The invention claimed is:

1. A heat transport medium to be transported with a fluid that is liquid in an operating temperature range, the heat transport medium comprising:
   a porous material having pores and
   a latent heat storage material penetrated in the pores of the porous material,
   wherein the porous material has a liquid repellency to the fluid, an affinity for the latent heat storage material, an open-cell structure, macropores having an average pore size of 3 to 200 μm, an apparent density of 0.05 to 0.5 g/cm$^3$, and a sponge hardness of not more than 50,
   the porous material has a polyorganosiloxane skeleton containing a difunctional unit and a tri- or more-functional unit and the molar ratio of the difunctional unit relative to the tri- or more-functional unit is 1/10 to 5/1, and
   the latent heat storage material is incompatible with the fluid and has a melting point within the operating temperature range.

2. The heat transport medium according to claim 1, wherein the porous material has a void ratio of not less than 50%.

3. The heat transport medium according to claim 1, wherein the porous material is in a particulate form having an average particle size of 0.1 to 50 mm.

4. The heat transport medium according to claim 1, wherein a ratio of the latent heat storage material is 100 to 5000 parts by weight relative to 100 parts by weight of the porous material.

5. The heat transport medium according to claim 1, wherein the porous material has macropores having an average pore size of 20 to 200 μm.

6. The heat transport medium according to claim 1, wherein the porous material contains a water-repellent lipophilic resin.

7. The heat transport medium according to claim 6, wherein the porous material has a contact angle with water of not less than 90°, and the porous material is capable of absorbing tetradecane and has substantially no contact angle with tetradecane.

8. The heat transport medium according to claim 6, wherein the latent heat storage material comprises an aliphatic hydrocarbon.

9. The heat transport medium according to claim 6, wherein the fluid comprises water.

10. A mixture for heat transport, comprising:

a heat transport medium recited in claim 1 and a fluid that is liquid in an operating temperature range and is incompatible with a latent heat storage material.

11. The mixture for heat transport according to claim 10, wherein a ratio of the heat transport medium is 1 to 50 parts by weight relative to 100 parts by weight of the fluid.

12. A heat transport method, comprising:

adding a heat transport medium recited in claim 1 to a fluid that is liquid in an operating temperature range and is incompatible with a latent heat storage material, and circulating the heat transport medium through a pipeline.

\* \* \* \* \*